United States Patent
Shin et al.

(10) Patent No.: US 9,665,795 B2
(45) Date of Patent: *May 30, 2017

(54) METHOD AND APPARATUS FOR IDENTIFYING ROOT CAUSE OF DEFECT USING COMPOSITE DEFECT MAP

(71) Applicant: SAMSUNG SDS CO., LTD., Seoul (KR)

(72) Inventors: Kae Young Shin, Yongin-si (KR); Min Kyun Doo, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 722 days.

This patent is subject to a terminal disclaimer.

(21) Appl. No.: 14/144,881

(22) Filed: Dec. 31, 2013

(65) Prior Publication Data

US 2014/0355866 A1 Dec. 4, 2014

(30) Foreign Application Priority Data

May 30, 2013 (KR) .................. 10-2013-0061842

(51) Int. Cl.
| | | |
|---|---|---|
| G06G 7/48 | (2006.01) | |
| G06K 9/62 | (2006.01) | |
| G06T 7/00 | (2017.01) | |

(52) U.S. Cl.
CPC .......... *G06K 9/6202* (2013.01); *G06T 7/0004* (2013.01); *G06K 2209/19* (2013.01); *G06T 2207/30164* (2013.01)

(58) Field of Classification Search
CPC .............. G06K 9/6202; G06K 2209/19; G06T 7/0004; G06T 2207/30164

(Continued)

(56) References Cited

U.S. PATENT DOCUMENTS 5,663,569 A * 9/1997 Hayano .................. G01N 21/94
250/559.06
6,763,130 B1 7/2004 Somekh et al.
(Continued)

FOREIGN PATENT DOCUMENTS

| JP | 2005-25451 A | 1/2005 |
|---|---|---|
| JP | 2008-108815 A | 5/2008 |

(Continued)

OTHER PUBLICATIONS

International Search Report, dated Mar. 6, 2014, issued by the Korean Intellectual Property Office in counterpart International Application No. PCT/KR2013/010193.

*Primary Examiner* — Saif Alhija
(74) *Attorney, Agent, or Firm* — Sughrue Mion, PLLC

(57) ABSTRACT

Provided are a method and apparatus for automatically determining defective equipment by using a sample defect map showing defect distribution in each cell of a defective sample and production history information of each product, wherein the defective sample is a set of products, each being divided into a plurality of cells. According to this invention, the method of determining defective equipment is provided. The method comprises, generating a sample defect map which shows defect distribution in each cell of a defective sample, generating an equipment defect map for at least one of pieces of equipment through which each product of the defective sample passed, calculating, for each piece of equipment whose equipment defect map has been generated, map similarity between the sample defect map and the equipment defect map, and determining one or more defective pieces of equipment, which are the cause of the defective sample, based on the map similarity for each piece of equipment whose equipment defect map has been generated, wherein the defective sample is a set of products, each being divided into a plurality of cells, and the equipment defect (Continued)

map for a specific piece of equipment shows defect distribution in each cell of products that passed through the specific piece of equipment among the products of the defective sample.

12 Claims, 7 Drawing Sheets

(58) Field of Classification Search
 USPC .............................................................. 703/6
 See application file for complete search history.

(56) References Cited

U.S. PATENT DOCUMENTS

| | | |
|---|---|---|
| 2004/0218806 A1 | 11/2004 | Miyamoto et al. |
| 2008/0201108 A1 | 8/2008 | Furem et al. |
| 2008/0276128 A1 | 11/2008 | Lin et al. |
| 2010/0320381 A1 | 12/2010 | Zhao |
| 2013/0058558 A1 | 3/2013 | Ueno et al. |

FOREIGN PATENT DOCUMENTS

| | | |
|---|---|---|
| JP | 2008-165832 A | 7/2008 |
| KR | 10-0696276 B1 | 3/2007 |
| WO | 2007-123238 A1 | 11/2007 |

\* cited by examiner

FIG. 6

| Cell ID | SAMPLE DEFECT MAP | EQUIPMENT DEFECT MAP OF EQUIPMENT 1 | | CELL SIMILARITY FOR EQUIPMENT 1 |
|---|---|---|---|---|
| 123 | 79 | 53 | | 67% |
| 63 | 53 | 44 | | 83% |
| 124 | 52 | 39 | | 75% |
| 65 | 46 | 35 | | 76% |
| 128 | 46 | 38 | | 83% |
| 70 | 37 | 32 | | 86% |
| 68 | 36 | 32 | | 89% |
| 56 | 33 | 21 | | 64% |
| 74 | 28 | 24 | | 86% |
| 90 | 28 | 23 | | 82% |
| 112 | 27 | 20 | | 74% |
| TOTAL= | 465 | 361 | MAP SIMILARITY | 79% |
| DEFECT OCCUPANCY = RATE | | 78% | DEFECT OCCUPANCY RATE | 78% |
| | | | SIMILARITY RATIO | 101% |

METHOD AND APPARATUS FOR IDENTIFYING ROOT CAUSE OF DEFECT USING COMPOSITE DEFECT MAP

This application claims priority from Korean Patent Application No. 10-2013-0061842 filed on May 30, 2013 in the Korean Intellectual Property Office, the disclosure of which is incorporated herein by reference in its entirety.

BACKGROUND OF THE INVENTION

1. Field of the Invention

The present invention relates to a method and apparatus for identifying defective equipment causing defective products, and more particularly, to a method and apparatus for identifying which piece of equipment needs to be fixed among pieces of equipment through which defective products of a defective sample passed by using a defect map of the entire defective sample composed of the defective products.

2. Description of the Related Art

When a product produced after passing through a plurality of pieces of equipment is defective, it is not easy to find which piece of equipment caused a defect in the product. This is because even if one piece of equipment is defective, it does not always cause a defect. In addition, defective products may have been produced after passing through different processes and pieces of equipment.

A product may be divided into a plurality of cells, and whether the product is defective may be determined on a cell-by-cell basis. In addition, a defective sample may consist of products, each having one or more defective cells. In this case, a sample defect map showing the number of defective cells in each cell position of the defective sample is generated, and a defective piece of equipment is searched for by inspecting the sample defect map with the naked eye. For example, by using an equipment defect map for each piece of equipment as a reference value, an analysis engineer may inspect the sample defect map and the equipment defect map with the naked eye. That is, the analysis engineer may find a defective piece of equipment by evaluating the similarity between the sample defect map and the equipment defect map. In this conventional method, however, a defective piece of equipment is determined not based on objective indices but based on the analysis engineer's subjective experience. Therefore, targets of analysis and the analysis result greatly vary according to the proficiency of the analysis engineer.

SUMMARY OF THE INVENTION

Aspects of the present invention provide a method and apparatus for automatically determining defective equipment by using a sample defect map showing defect distribution in each cell of a defective sample and production history information of each product, wherein the defective sample is a set of products, each being divided into a plurality of cells.

Aspects of the present invention also provide a computer-readable recording medium on which a program for automatically determining defective equipment by using a sample defect map showing defect distribution in each cell of a defective sample and production history of each product is recorded, wherein the defective sample is a set of products, each being divided into a plurality of cells.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a method of determining defective equipment, the method comprises, generating a sample defect map which shows defect distribution in each cell of a defective sample, generating an equipment defect map for at least one of pieces of equipment through which each product of the defective sample passed, calculating, for each piece of equipment whose equipment defect map has been generated, map similarity between the sample defect map and the equipment defect map, and determining one or more defective pieces of equipment, which are the cause of the defective sample, based on the map similarity for each piece of equipment whose equipment defect map has been generated, wherein the defective sample is a set of products, each being divided into a plurality of cells, and the equipment defect map for a specific piece of equipment shows defect distribution in each cell of products that passed through the specific piece of equipment among the products of the defective sample.

According to another aspect of the present invention, there is provided a computer-readable recording medium on which a computer program is recorded, the computer program performs, a process of generating a sample defect map which shows defect distribution in each cell of a defective sample, a process of generating an equipment defect map for at least one of pieces of equipment through which each product of the defective sample passed, a process of calculating, for each piece of equipment whose equipment defect map has been generated, map similarity between the sample defect map and the equipment defect map, and a process of determining one or more defective pieces of equipment, which are the cause of the defective sample, based on the map similarity for each piece of equipment whose equipment defect map has been generated, wherein the defective sample is a set of products, each being divided into a plurality of cells, and the equipment defect map for a specific piece of equipment shows defect distribution in each cell of products that passed through the specific piece of equipment among the products of the defective sample.

According to still another aspect of the present invention, an apparatus for determining defective equipment, the apparatus comprises, a sample defect map generation unit generating a sample defect map which shows defect distribution in each cell of a defective sample, an equipment defect map generation unit generating an equipment defect map for at least one of pieces of equipment through which each product of the defective sample passed, and a determination unit calculating, for each piece of equipment whose equipment defect map has been generated, map similarity between the sample defect map and the equipment defect map and determining one or more defective pieces of equipment, which are the cause of the defective sample, based on the map similarity for each piece of equipment whose equipment defect map has been generated, wherein the defective sample is a set of products, each being divided into a plurality of cells, and the equipment defect map for a specific piece of equipment shows defect distribution in each cell of products that passed through the specific piece of equipment among the products of the defective sample.

BRIEF DESCRIPTION OF THE DRAWINGS

The above and other aspects and features of the present invention will become more apparent by describing in detail exemplary embodiments thereof with reference to the attached drawings, in which:

FIG. 6 is a conceptual diagram illustrating a method of calculating a similarity ratio between a sample defect map and an equipment defect map;

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The term "equipment," as used herein, refers to a specific piece of equipment used in a specific process. That is, each piece of equipment used in the present specification is identified by a combination of a process identifier and an equipment identifier. For example, when equipment X is used in processes A and B, equipment X in process A and equipment X in process B are treated as different pieces of equipment.

In the present specification, a product is divided into a plurality of cells. The product may be, for example, a semiconductor wafer, a display glass, etc.

A method of determining defective equipment according to an embodiment of the present invention will now be described with reference to FIG. 1.

Figure 1:
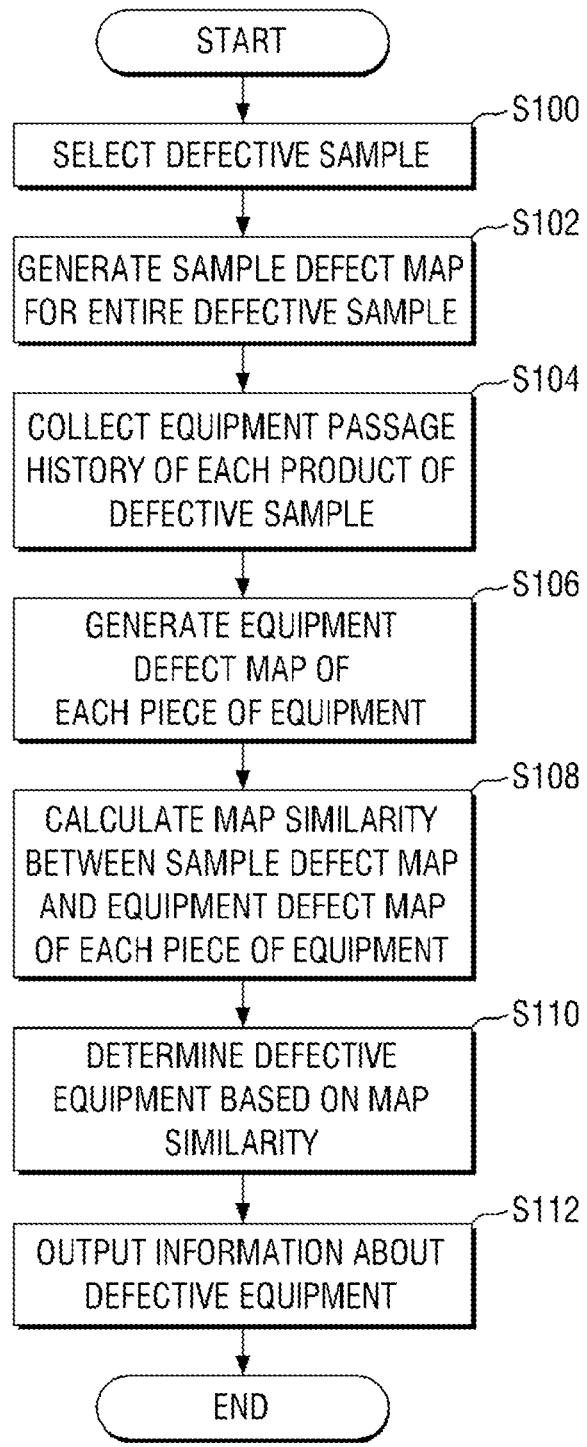
FIG. 1 is a flowchart illustrating a method of determining defective equipment according to an embodiment of the present invention.

Referring to FIG. 1, a defective sample, based on which defective equipment is to be determined, is selected (operation S100). The defective sample consists of a plurality of products, each having one or more defective cells. Whether each cell included in each of the products is defective is determined by a product inspection apparatus. The criteria for selecting the defective sample may be input from a terminal of a process manager. The criteria for selecting the defective sample may include at least one of a defect identifier, defect determination information (good, reject, defer, etc.), a product name, and an inspection data extraction period.

Figures 2, 3:
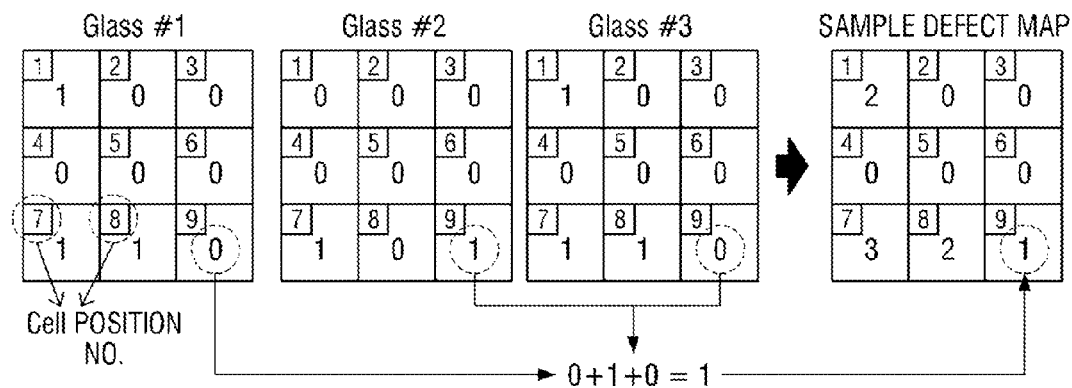
FIG. 2 is a conceptual diagram illustrating a method of generating a sample defect map according to an embodiment of the present invention.
FIG. 3 is a conceptual diagram illustrating a method of calculating the map similarity between a sample defect map and an equipment defect map.

Once the defective sample is selected, a sample defect map of the selected defective sample is generated (operation S102). The generation of the sample defect map will now be described with reference to FIG. 2. In FIG. 2, a process of generating a sample defect map of a defective sample is illustrated. The defective sample consists of three sheets of glass, each having a plurality of cells arranged in a 3×3 matrix. Each cell is identified by its unique cell number, and whether each cell is defective is shown therein, wherein one indicates "defective," and zero indicates "non-defective."

Information about whether each cell included in each glass of the defective sample is defective can be obtained from inspection data created by the product inspection apparatus.

Referring to FIG. 2, a sample defect map shows defect distribution in each cell of the entire defective sample (i.e., in each cell of all products of a defective sample). For example, cell #7 is defective in all of glass #1, glass #2 and glass #3. Thus, a value corresponding to cell #7 in the sample defect map is 1+1+1=3. In addition, cell #8 is defective in both glass #1 and #3. Thus, a value corresponding to cell #8 in the sample defect map is 1+1=2. Also, cell #9 is defective only in glass #2. Thus, a value corresponding to cell #9 in the sample defect map is 1. That is, a "sample defect map," as used herein, shows the number of defective cells in each cell position of the entire defective sample (i.e., in each cell position of all products of a defective sample). To generate the sample defect map, products having the same cell configuration should be included in the defective sample.

Referring back to FIG. 1, after the generation of the sample defect map is completed (operation S102), an equipment passage history of each product included in the defective sample is collected from production history information, for example, work in process (WIP) information (operation S104). Then, an equipment defect map is generated for each piece of equipment (operation S106). For example, a defective sample may include glass #1, glass #2, and glass #3. In addition, glass #1 may have passed through equipment PHOTO_P1 (equipment P1 of a photo process) and equipment DRY_D1 (equipment D1 of a dry process), glass #2 may have passed through equipment PHOTO_P1 (equipment P1 of the photo process) and equipment DRY_D3 (equipment D3 of the dry process), and glass #3 may have passed through equipment PHOTO_P3 (equipment P3 of the photo process) and equipment DRY_D1 (equipment D1 of the dry process). In this case, the equipment defect map may be generated for each of PHOTO_P1, PHOTO_P3, DRY_D1, and DRY_3.

That is, the equipment defect map may be generated for each piece of equipment through which all products included in a defective sample passed at least once.

A method of generating an equipment defect map for specific equipment is the same as the method of generating a sample defect map (described above with reference to FIG. 2), except that defective cells of not all products of a defective sample but of products that passed through the specific equipment are added up.

For example, a defective sample may include glass #1, glass #2, glass #3, and glass #4. In addition, glass #1 may have passed through equipment PHOTO_P1 (equipment P1 of a photo process) and equipment DRY_D1 (equipment D1 of a dry process), glass #2 may have passed through equipment PHOTO_P1 (equipment P1 of the photo process) and equipment DRY_D3 (equipment D3 of the dry process), glass #3 may have passed through equipment PHOTO_P3 (equipment P3 of the photo process) and equipment DRY_D1 (equipment D1 of the dry process), and glass #4 may have passed through equipment PHOTO_P2 (equipment P2 of the photo process) and equipment DRY_D3 (equipment D3 of the dry process). In this case, an equipment defect map for equipment PHOTO_P1 may be generated by adding up the number of defective cells in each cell position of glass #1 and glass #2. In addition, an equipment defect map for equipment DRY_D1 may be generated by adding up the number of defective cells in each cell position of glass #1 and glass #3.

In FIG. 1, after the selection of the defective sample (operation S100), the sample defect map is generated, and then the equipment defect map of each piece of equipment is generated. However, the equipment defect map of each piece of equipment can also be generated before the sample defect map.

After the sample defect map of the entire defective sample is generated and then the equipment defect map of each piece of equipment through which all products included in the defective sample passed at least once is generated, the equipment defect map of each piece of equipment may be compared with the sample defect map to evaluate the similarity between them. According to the present invention, the similarity between the sample defect map and the equipment defect map of each piece of equipment may be calculated based on map similarity, and the map similarity may be calculated using cell similarity which is a ratio of the number of defective cells in each cell position of the equipment defect map to the number of defective cells in a corresponding cell position of the sample defect map. A method of calculating map similarity will now be described with reference to FIG. 3.

As described above, the cell similarity of each cell position should be calculated in advance in order to calculate the map similarity between a sample defect map and an equipment defect map. In FIG. 3, a sample defect map and an equipment defect map of specific equipment (e.g., PHOTO_P1) are illustrated as an example. In the case of cell position #1, the number of defective cells is five in both the sample defect map and the equipment defect map. This indicates that the number of products whose cell #1 is defective among all products included in a sample is five and that the number of products whose cell #1 is defective among all products that passed through PHOTO_P1 is also five. The cell similarity of a specific cell position may be "a value obtained by dividing the number of defective cells in the specific cell position of the equipment defect map by the number of defective cells in the specific cell position of the sample defect map." Therefore, the cell similarity of cell position #1 is 5/5=1. Likewise, the cell similarity of cell position #2 is 3/5=0.6.

According to an embodiment, the map similarity may be the average of cell similarity values of all cell positions.

If the map similarity is calculated by reflecting cell similarity values of all cell positions, the time and cost required to calculate the map similarity increase as one product is divided into a greater number of cells. In addition, it may be more effective to calculate the map similarity using the average of cell similarity values of each group of cell positions having similar numbers of defective cells than by reflecting cell similarity values of all cell positions. Therefore, according to another embodiment, the map similarity may be calculated by calculating the average of cell similarity values of one group of cell positions among a group of high defective cell positions, a group of medium defective cell positions, and a group of low defective cell positions.

A method of classifying cell positions of one product into high defective cell positions, low defective cell positions, and medium defective cell positions according to the number of defective cells will now be described.

Figure 4:
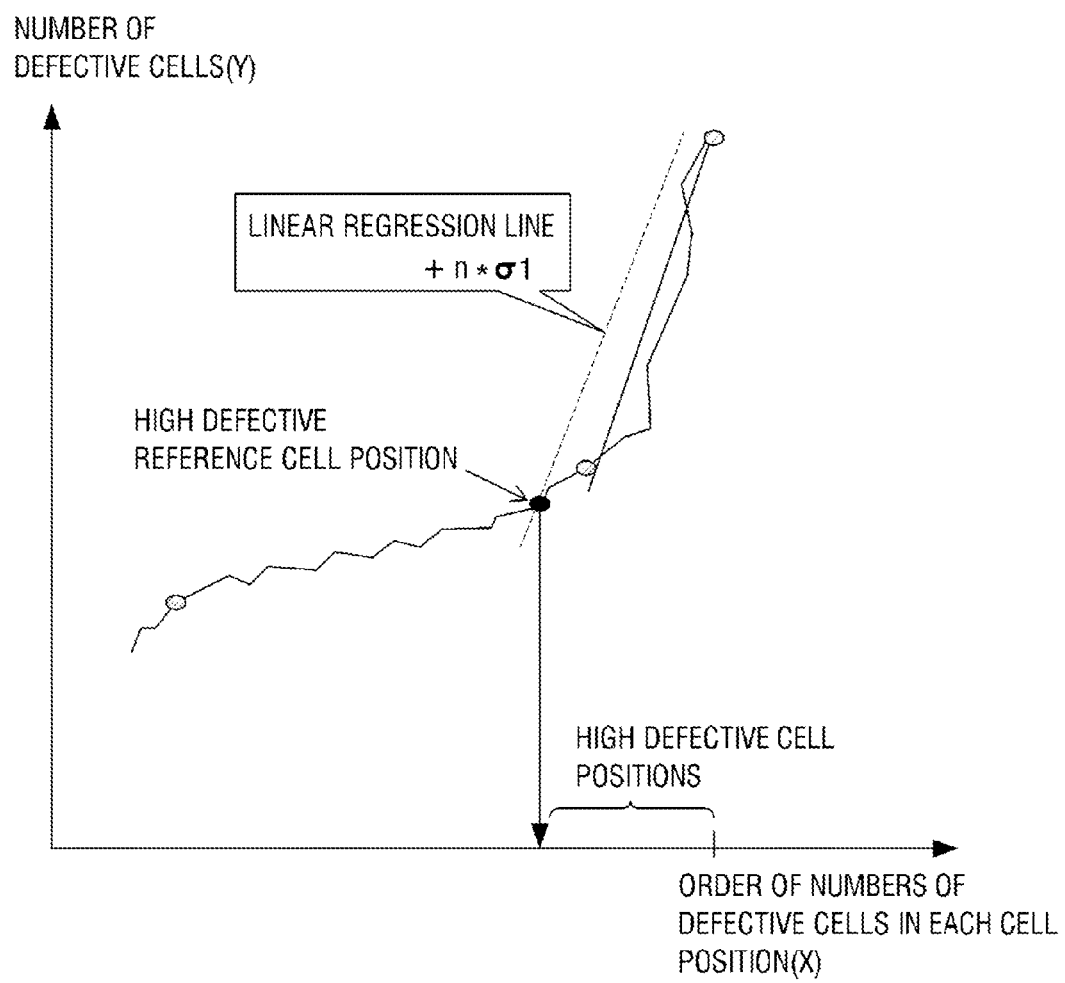
FIG. 4 is a conceptual diagram illustrating a method of selecting high defective cell positions.

First, a method of selecting high defective cell positions will be described with reference to FIG. 4. FIG. 4 is a graph illustrating the number of defective cells in each cell position. The X axis represents the order of the number of defective cells in each cell position. Each cell position is sorted by the order of the number of defective cells in each cell position, in ascending order. The Y axis represents the number of defective cells in each cell position. As the value of the X axis increases, a cell position is placed higher in the order of the cell positions (i.e., includes more defective cells).

In a first operation, a predetermined number of cell positions are selected from all cell positions of each product in a defective sample in order of largest number of defective cells. For example, cell positions having the top ten numbers of defective cells may be selected.

In a second operation, a linear regression equation of the selected cell positions is calculated. The linear regression equation can be calculated using various methods such as interpolation, regression analysis, etc.

In a third operation, differences between actual numbers of defective cells of the selected cell positions and estimated numbers of defective cells obtained by the linear regression equation are calculated, and a standard deviation $\sigma 1$ of the differences is calculated.

In a fourth operation, a modified regression equation is calculated by adding or subtracting a predetermined multiple (n) of the standard deviation $\sigma 1$ to or from the linear regression equation. As illustrated in FIG. 4, the "modified regression equation=linear regression equation+n×standard deviation1 ($\sigma 1$)."

In a fifth operation, a high defective reference cell position is selected from cell positions excluding the selected cell positions by using the modified regression equation. For example, from among cell positions that meet the modified regression equation on the graph of FIG. 4, a cell position having a largest number of defective cells may be selected as the high defective reference cell position.

In a sixth operation, all cell positions having numbers of defective cells equal to or greater than the number of defective cells of the high defective reference cell position are selected as high defective cell positions.

Figure 5:
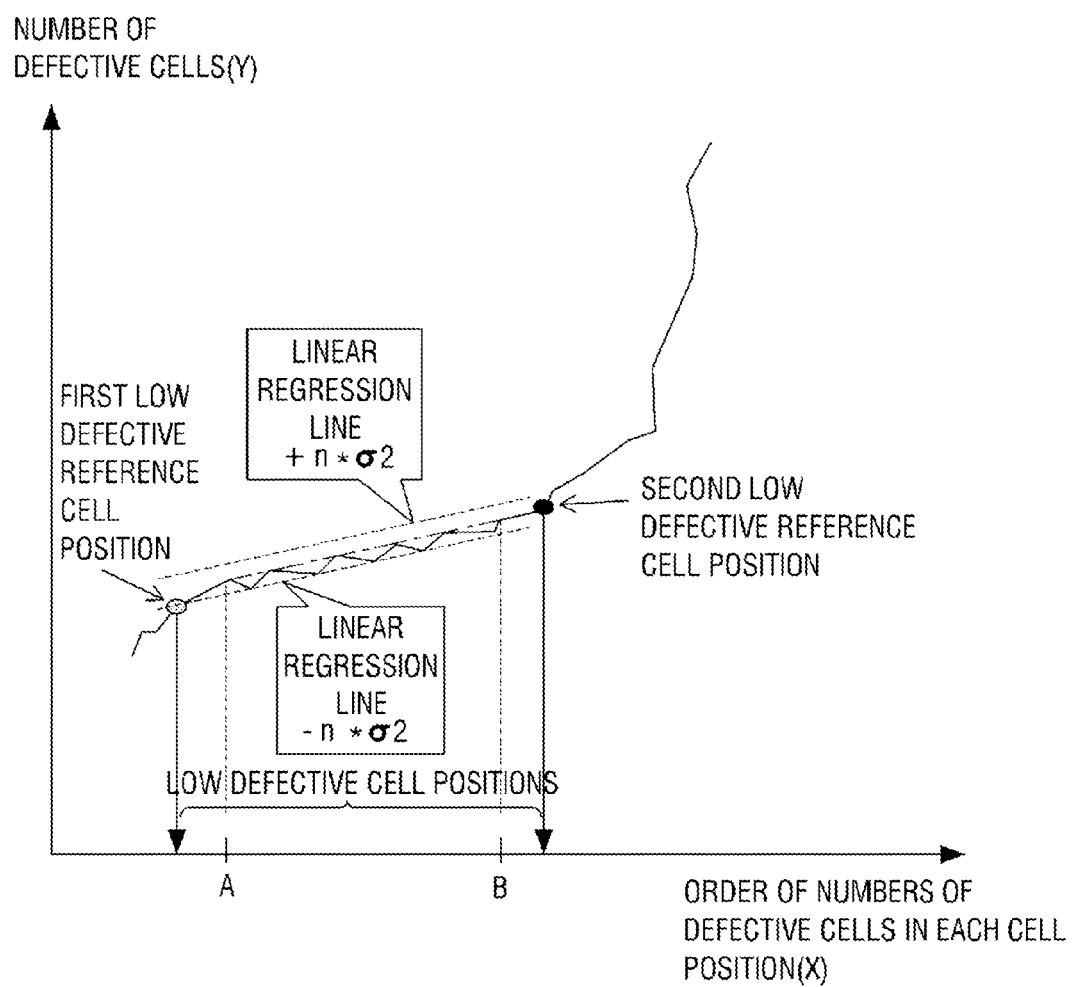
FIG. 5 is a conceptual diagram illustrating a method of selecting low defective cell positions.

A method of selecting low defective cell positions will now be described with reference to FIG. 5. Like FIG. 4, FIG. 5 is a graph illustrating the number of defective cells in each cell position. The X axis represents the order of the number of defective cells in each cell position. Each cell position is sorted by the order of the number of defective cells in each cell position, in ascending order. The Y axis represents the number of defective cells in each cell position. As the value of the X axis increases, a cell position is placed higher in the order of the cell positions (i.e., includes more defective cells).

In a first operation, a predetermined number of cell positions having numbers of defective cells which rank middle in the order of the numbers of defective cells are selected from all cell positions of each product in a defective sample.

In a second operation, a linear regression equation of the selected cell positions is calculated by using the order of the numbers of defective cells in each cell position as the X axis variable, and the number of defective cells in each cell position as the Y variable. The linear regression equation can be calculated using various methods such as interpolation, regression analysis, etc.

In a third operation, differences between actual numbers of defective cells of the selected cell positions and estimated numbers of defective cells obtained by the linear regression equation are calculated, and a standard deviation σ2 of the differences is calculated.

In a fourth operation, a first modified regression equation is calculated by adding a predetermined multiple (n) of the standard deviation σ2 to the linear regression equation. As illustrated in FIG. 5, the "first modified regression equation=linear regression equation+n×σ2."

In a fifth operation, a second modified regression equation is calculated by subtracting the predetermined multiple (n) of the standard deviation σ2 from the linear regression equation. As illustrated in FIG. 5, the "second modified regression equation=linear regression equation−n×σ2."

In a sixth operation, a second low defective reference cell position is selected from cell positions excluding the selected cell positions by using the first modified regression equation. For example, from among cell positions that meet the first modified regression equation on the graph of FIG. 5, a cell position having a largest number of defective cells may be selected as the second low defective reference cell position.

In a seventh operation, a first low defective reference cell position is selected from the cell positions excluding the selected cell positions by using the second modified regression equation. For example, from among cell positions that meet the second modified regression equation on the graph of FIG. 5, a cell position having a smallest number of defective cells may be selected as the first low defective reference cell position.

In an eighth operation, all cell positions having numbers of defective cells between the number of defective cells of the first low defective reference cell position and the second low defective reference cell position are selected as low defective cell positions.

Medium defective cell positions are cell positions excluding the high defective cell positions and the low defective cell positions. A method of selecting medium defective cell positions will now be described.

In a first operation, a predetermined number of cell positions are selected from all cell positions of each product in a defective sample in order of largest number of defective cells.

In a second operation, a linear regression equation of the selected cell positions is calculated by using the order of the numbers of defective cells in each cell position as the X axis variable, and the number of defective cells as the Y variable.

In a third operation, differences between actual numbers of defective cells of the selected cell positions and estimated numbers of defective cells obtained by the linear regression equation are calculated, and a standard deviation of the differences is calculated.

In a fourth operation, a modified regression equation is calculated by adding or subtracting a predetermined multiple of the standard deviation to or from the linear regression equation.

In a fifth operation, a high defective reference cell position is selected from cell positions excluding the selected cell positions by using the modified regression equation.

In a sixth operation, all cell positions having numbers of defective cells equal to or greater than the number of defective cells of the high defective reference cell position are selected as high defective cell positions.

In a seventh operation, a predetermined number of cell positions having numbers of defective cells which rank middle in the order of the numbers of defective cells are selected from all cell positions of each product in the defective sample.

In an eighth operation, a linear regression equation of the selected cell positions is calculated by using the order of the numbers of defective cells in each cell as the X axis variable, and the number of defective cells in each cell position as the Y axis variable.

In a ninth operation, differences between actual numbers of defective cells of the selected cell positions and estimated numbers of defective cells obtained by the linear regression equation are calculated, and a standard deviation of the differences is calculated.

In a tenth operation, a first modified regression equation is calculated by adding a predetermined multiple of the standard deviation to the linear regression equation.

In an eleventh operation, a second modified regression equation is calculated by subtracting the predetermined multiple of the standard deviation from the linear regression equation.

In a twelfth operation, a second low defective reference cell position is selected from cell positions excluding the selected cell positions by using the first modified regression equation.

In a thirteenth operation, a first low defective reference cell position is selected from the cell positions excluding the selected cell positions by using the second modified regression equation.

In an fourteenth operation, all cell positions having numbers of defective cells between the number of defective cells of the first low defective reference cell position and the number of defective cells of the second low defective reference cell position are selected as low defective cell positions.

In a fifteenth operation, all cell positions excluding the high defective cell positions and the low defective cell positions are selected as medium defective cell positions.

Until now, the methods of selecting the high defective cell positions, the medium defective cell positions and the low defective cell positions have been described. According to an embodiment of the present invention, the map similarity may be calculated using a predetermined group of cell positions or a group of cell positions designated by data received from a terminal of a process manager.

According to an embodiment, defective equipment may be determined based on a similarity ratio calculated using map similarity. The similarity ratio is a ratio of the map similarity and a defect occupancy rate. The defect occupancy rate for a specific piece of equipment is the proportion of the number of defective cells included in products of a defective sample that passed through the specific piece of equipment in the total number of defective cells included in a sample defect map. A method of determining defective equipment based on a similarity ratio will now be described with reference to FIG. 6.

Referring to FIG. 6, a similarity ratio may be calculated using the number of defective cells in cell positions that belong to one of a group of high defective cell positions, a group of medium defective cell positions, and a group of low defective cell positions. It will hereinafter be assumed that cell positions illustrated in FIG. 6 are high defective cell positions.

In FIG. 6, the map similarity between a sample defect map and an equipment defect map of equipment 1 which was calculated using the number of defective cells of high defective cell positions is 79%. Here, the total number of defective cells in high defective cell positions of all products of a defective sample is 465, and the total number of defective cells in high defective cell positions of products that passed through equipment 1 is 361. Therefore, a defect occupancy rate is (361/465)×100=78%, and a similarity ratio which is a ratio of the map similarity to the defect occupancy rate is 101%.

Referring back to FIG. 1, after map similarity for each piece of equipment is calculated (operation S108), defective equipment is determined based on the map similarity (operation S110). According to an embodiment, as described above, defective equipment can be determined based on a similarity ratio which is calculated using the map similarity. According to an embodiment, a list of pieces of equipment arranged in order of highest map similarity value or similarity ratio may be generated. In this case, top N pieces of equipment on the list may be determined to be defective pieces of equipment. Alternatively, pieces of equipment having map similarity values or similarity ratios less than a specific map similarity value or similarity ratio may be excluded from candidate pieces of defective equipment.

Information about the defective equipment is output from a terminal of a process manager (operation S112).

A computer-readable recording medium according to another embodiment of the present invention can record a computer program that executes the defective equipment determination method described above with reference to FIGS. 1 through 6. That is, the defective equipment determination method described above with reference to FIGS. 1 through 6 can be implemented by executing the computer program. The computer program performs a process of generating a sample defect map which shows defect distribution in each cell of a defective sample, a process of generating an equipment defect map for at least one of pieces of equipment through which each product of the defective sample passed, a process of calculating, for each piece of equipment whose equipment defect map has been generated, map similarity between the sample defect map and the equipment defect map, and a process of determining one or more defective pieces of equipment, which are the cause of the defective sample, based on the map similarity for each piece of equipment whose equipment defect map has been generated, wherein the defective sample is a set of products, each being divided into a plurality of cells, and the equipment defect map for a specific piece of equipment shows defect distribution in each cell of products that passed through the specific piece of equipment among the products of the defective sample.

Figure 7:
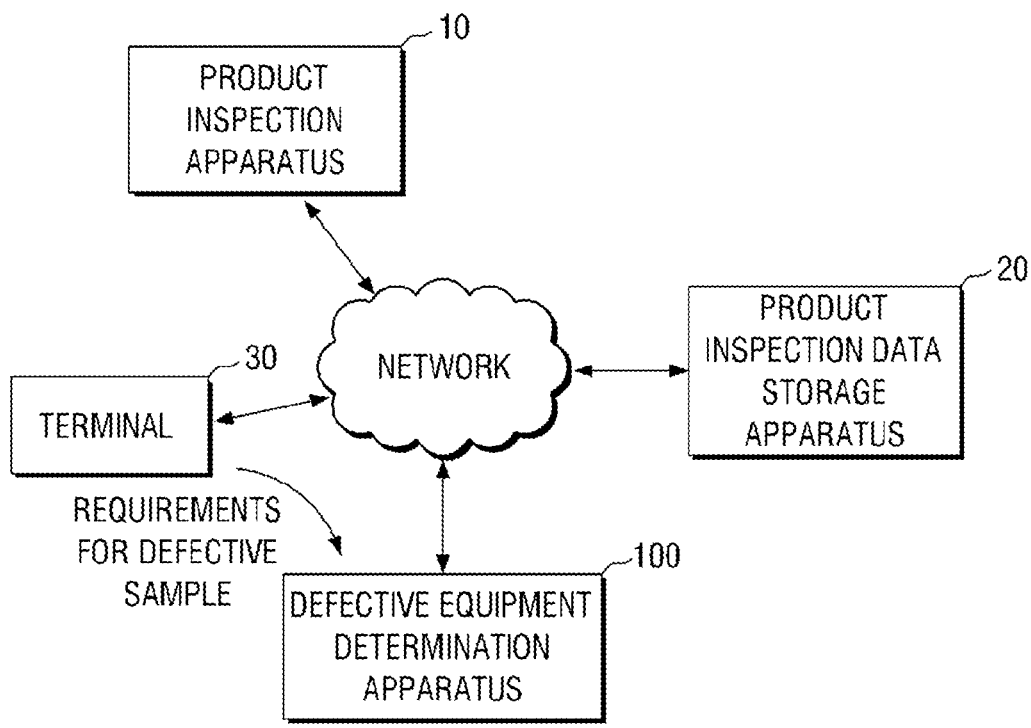
FIG. 7 is a block diagram of a system for determining defective equipment according to another embodiment of the present invention.

The configuration of a system for determining defective equipment according to another embodiment of the present invention will now be described with reference to FIG. 7.

A product inspection apparatus 10 inspects whether products produced after passing through one or more pieces of equipment are defective. For example, the product inspection apparatus 10 determines whether a defect exists in each cell of a product by capturing an image of the product and processing the captured image and determines whether each cell of the product is defective based on the determination result. The inspection result of the product inspection apparatus 10 is stored in a product inspection data storage apparatus 20.

A defective equipment determination apparatus 100 automatically determines defective equipment by using a sample defect map, which shows defect distribution in each cell of a defective sample, and production history information of each product, wherein the defective sample is a set of products, each being divided into a plurality of cells. The production history information can be retrieved from a process management system (not shown). The defective equipment determination device 100 generates a sample defect map which shows defect distribution in each cell of a defective sample, generates an equipment defect map for at least one of pieces of equipment through which each product of the defective sample passed, calculates, for each piece of equipment whose equipment defect map has been generated, map similarity between the sample defect map and the equipment defect map, and determines one or more defective pieces of equipment, which are the cause of the defective sample, based on the map similarity for each piece of equipment whose equipment defect map has been generated, wherein the defective sample is a set of products, each being divided into a plurality of cells.

A terminal 30 may transmit defective sample requirement data that designates products to be included in a defective sample. The defective equipment determination apparatus 100 may collect data about products that satisfy the defective sample requirement data from the product inspection data storage apparatus 20 and configure the defective sample.

Figure 8:
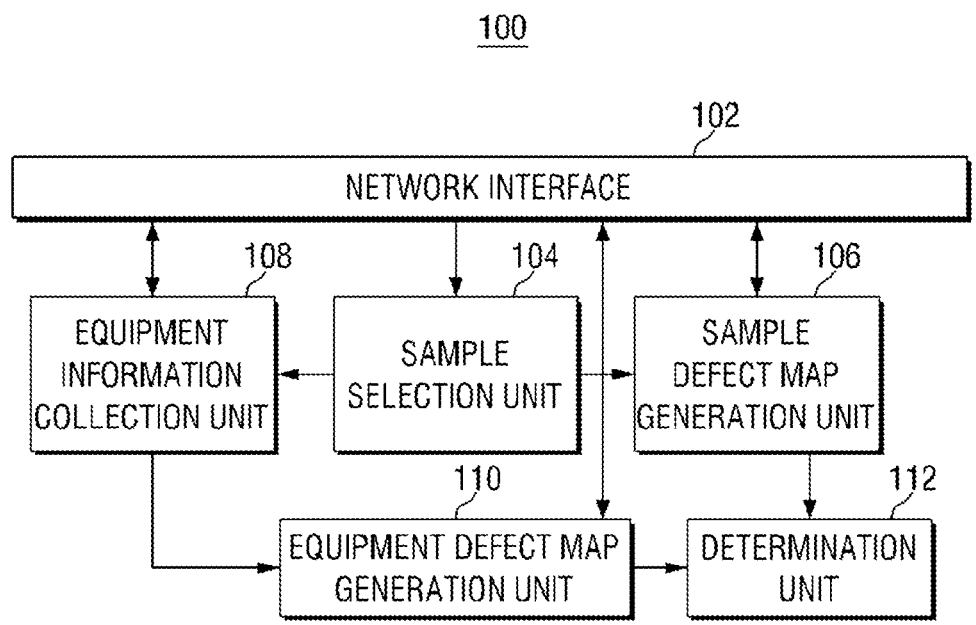
FIG. 8 is a block diagram of an apparatus for determining defective equipment according to another embodiment of the present invention.

Referring to FIG. 8, the defective equipment determination apparatus 100 according to the current embodiment may include a network interface 102 which is responsible for data transmission and reception, a sample selection unit 104, a sample defect map generation unit 106, an equipment information collection unit 108, an equipment defect map generation unit 110, and a determination unit 112.

The sample defect map generation unit 110 generates a sample defect map showing defect distribution in each cell of a defective sample which is a set of products, each being divided into a plurality of cells.

The equipment information collection unit 108 collects information about one or more pieces of equipment, through which the products of the defective cell passed, from product inspection data.

The equipment defect map generation unit 110 generates an equipment defect map for at least one of the pieces of equipment (the information about which has been collected by the equipment information collection unit 108) through which the products of the defective sample passed.

The determination unit 112 calculates, for each piece of equipment whose equipment defect map has been generated, map similarity between the sample defect map and the equipment defect map and determines one or more defective pieces of equipment, which are the cause of the defective sample, based on the map similarity for each piece of equipment whose equipment defect map has been generated. The determination unit 112 may determine one or more pieces of defective equipment, which are the cause of the defective sample, based on a similarity ratio calculated using the map similarity.

Figure 9:
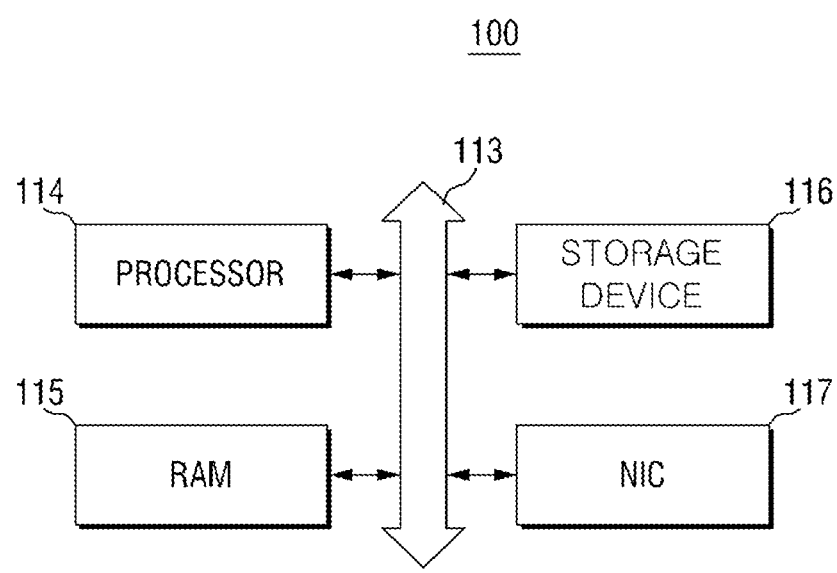
FIG. 9 is a diagram illustrating another configuration of the defective equipment determination apparatus shown in FIG. 8.

The defective equipment determination apparatus 100 may also be configured as illustrated in FIG. 9. The defective equipment determination apparatus 100 may include a processor 114 which executes instructions, a storage device 116 which stores defective equipment determination program data, a memory 115, and a network interface (NIC) 117 for data exchange with an external device.

The storage device 116 may store execution files and libraries of a computer program which performs a process of generating a sample defect map which shows defect distribution in each cell of a defective sample, a process of generating an equipment defect map for at least one of pieces of equipment through which each product of the defective sample passed, a process of calculating, for each piece of equipment whose equipment defect map has been generated, map similarity between the sample defect map and the equipment defect map, and a process of determining one or more defective pieces of equipment, which are the cause of the defective sample, based on the map similarity for each piece of equipment whose equipment defect map has been generated, wherein the defective sample is a set of products, each being divided into a plurality of cells, and the equipment defect map for a specific piece of equipment shows defect distribution in each cell of products that passed through the specific piece of equipment among the products of the defective sample.

According to the present invention, defective equipment that causes a defect can be determined using an objective method. That is, an equipment defect map generated for each piece of equipment through which products included in a defective sample passed is automatically compared with a sample defect map generated for the entire defective sample by using a predetermined mathematical method. Therefore, one or more defective pieces of equipment can be determined based not on a person's subjective experience but on objective criteria.

However, the effects of the present invention are not restricted to the one set forth herein. The above and other effects of the present invention will become more apparent to one of daily skill in the art to which the present invention pertains by referencing the claims.

What is claimed is:

1. A method of determining defective equipment, the method comprising:
   generating a sample defect map which shows defect distribution in cells of a defective sample;
   generating equipment defect maps of a plurality of pieces of equipment through which products of the defective sample passed;
   calculating map similarities between the sample defect map and the equipment defect maps; and
   determining one or more defective pieces of equipment of the plurality of pieces of equipment, which are the cause of the defective sample, based on the map similarities,
   wherein the defective sample comprises the products, each of the products being divided into a plurality of cells, and one of the equipment defect maps for one of the plurality of pieces of equipment, shows a defect distribution in cells of the products that passed through the one of the plurality of pieces of equipment,
   wherein the calculating of the map similarity for each piece of equipment whose equipment defect map has been generated comprises:
      calculating cell similarity of each cell position of each product, for each piece of equipment that each product passed through, and whose equipment defect map has been generated; and
      calculating map similarity for each piece of equipment whose equipment defect map has been generated,
   wherein the cell similarity of a specific cell position is a ratio of the number of defective cells in the specific cell position of the equipment defect map to the number of defective cells in the specific cell position of the sample defect map, and the map similarity is the average of cell similarity values of at least some of the cell positions.

2. The method of claim 1, wherein the generating of the equipment defect maps comprises:
   calculating defect rates for the plurality of pieces of equipment through which the products of the defective sample passed; and
   generating the equipment defect maps for the plurality of pieces of equipment whose defect rates exceed a predetermined reference value,
   wherein one of the defect rates for the one of the plurality of pieces of equipment is a ratio of a number of defective cells included in the products of the defective sample that passed through the one of the plurality of pieces of equipment to a total number of defective cells included in all the products of the defective sample.

3. The method of claim 1, wherein the calculating of the map similarities comprises calculating a map similarity, which is an average of cell similarity values of cell positions of interest selected based on the number of defective cells, for one of the plurality of pieces of equipment.

4. The method of claim 3, wherein in the calculating the map similarities comprises:
   selecting a predetermined number of cell positions from all cell positions of the products in the defective sample in an order of a largest number of defective cells;
   calculating a linear regression equation of the selected predetermined number of cell positions by using an order of the numbers of defective cells in each of predetermined number of cell positions as X axis variable, and the number of defective cells as Y variable;
   calculating differences between actual numbers of defective cells of the selected predetermined number of cell positions and estimated numbers of defective cells obtained by the linear regression equation and calculating a standard deviation of the differences;
   calculating a modified regression equation by adding or subtracting a predetermined multiple of the standard deviation to or from the linear regression equation;
   selecting a high defective reference cell position from cell positions excluding the selected cell positions by using the modified regression equation; and
   selecting all cell positions having numbers of defective cells equal to or greater than a number of defective cells of the high defective reference cell position, as the cell positions of interest.

5. The method of claim 3, wherein the calculating of the map similarities comprises:
   selecting a predetermined number of cell positions having numbers of defective cells which rank at about a middle in an order of numbers of defective cells from all cell positions of the products in the defective sample;
   calculating a linear regression equation of the selected predetermined number of cell positions by using an order of the numbers of defective cells in each of predetermined number of cell positions as the X axis variable, and the number of defective cells as the Y axis variable;
   calculating differences between actual numbers of defective cells of the selected predetermined number of cell positions and estimated numbers of defective cells obtained by the linear regression equation and calculating a standard deviation of the differences;

calculating a first modified regression equation by adding a predetermined multiple of the standard deviation to the linear regression equation;

calculating a second modified regression equation by subtracting the predetermined multiple of the standard deviation from the linear regression equation;

selecting a second low defective reference cell position from cell positions excluding the selected cell positions by using the first modified regression equation;

selecting a first low defective reference cell position from the cell positions excluding the selected cell positions by using the second modified regression equation; and selecting all cell positions having numbers of defective cells between the number of defective cells of the first low defective reference cell position and the second low defective reference cell position, as the cell positions of interest.

6. The method of claim 3, wherein the calculating of the map similarities comprises:

selecting a predetermined number of cell positions from all cell positions of the products in the defective sample in an order of largest number of defective cells;

calculating a linear regression equation of the selected predetermined number of cell positions by using an order of the numbers of defective cells in each of predetermined number of cell positions as the X axis variable, and the number of defective cells as the Y axis variable;

calculating differences between actual numbers of defective cells of the selected predetermined number of cell positions and estimated numbers of defective cells obtained by the linear regression equation and calculating a standard deviation of the differences;

calculating a modified regression equation by adding or subtracting a predetermined multiple of the standard deviation to or from the linear regression equation;

selecting a high defective reference cell position from cell positions excluding the selected cell positions by using the modified regression equation;

selecting all cell positions having numbers of defective cells equal to or greater than a number of defective cells of the high defective reference cell position, as high defective cell positions;

selecting a predetermined number of cell positions having numbers of defective cells which rank at about a middle in an order of the numbers of defective cells from all cell positions of the products in the defective sample;

calculating a linear regression equation of the selected predetermined number of cell positions by using an order of the numbers of defective cells in each of predetermined number of cell positions as the X axis variable, and the number of defective cells as the Y axis variable;

calculating differences between actual numbers of defective cells of the selected predetermined number of cell positions and estimated numbers of defective cells obtained by the linear regression equation and calculating a standard deviation of the differences;

calculating a first modified regression equation by adding a predetermined multiple of the standard deviation to the linear regression equation;

calculating a second modified regression equation by subtracting the predetermined multiple of the standard deviation from the linear regression equation;

selecting a second low defective reference cell position from cell positions excluding the selected cell positions by using the first modified regression equation;

selecting a first low defective reference cell position from the cell positions excluding the selected cell positions by using the second modified regression equation;

selecting all cell positions having numbers of defective cells between a number of defective cells of the first low defective reference cell position and a number of defective cells of the second low defective reference cell position as low defective cell positions; and selecting all cell positions excluding the high defective cell positions and the low defective cell positions, as medium defective cell positions.

7. The method of claim 1, wherein the determining of the one or more defective pieces of equipment comprises:

calculating similarity ratios for the plurality of pieces of equipment;

determining one or more pieces of the plurality of pieces of equipment, which are the cause of the defective sample, based on the calculated similarity ratios, wherein one of the similarity ratios is a ratio of one of the map similarities to a defect occupancy rate, and the defect occupancy rate for a specific piece of equipment of the plurality pieces of equipment is a proportion of the number of defective cells included in the products of the defective sample that passed through the specific piece of equipment in the total number of defective cells included in the sample defect map.

8. The method of claim 7, wherein the defect occupancy rate for a specific piece of equipment of the plurality of pieces of equipment is a proportion of the number of defective cells included in cell positions of interest of the products in the defective sample that passed through the specific piece of equipment in the number of defective cells included in the cell positions of interest of the products of the defective sample, wherein the cell positions of interest are cell positions which are used in the calculation of the map similarities between the sample defect map and the equipment defect maps.

9. The method of claim 1, further comprising receiving criteria for selecting the defective sample and selecting products to be included in the defective sample from inspection result information of the products which are included in product inspection data.

10. A non-transitory machine readable storage medium on which a computer program is recorded, the computer program performing:

a process of generating a sample defect map which shows defect distribution in cells of a defective sample;

a process of generating equipment defect maps of a plurality of pieces of equipment through which the products of the defective sample passed;

a process of calculating map similarities between the sample defect map and the equipment defect maps; and a process of determining one or more defective pieces of equipment of the plurality of pieces of equipment, which are the cause of the defective sample, based on the map similarities, wherein the defective sample comprises the products, each of the products being divided into a plurality of cells, and one of the equipment defect maps for one of the plurality of pieces of equipment, shows a defect distribution in cells of the products that passed through the one of the plurality of pieces of equipment, wherein the process of calculating of the map similarity for each piece of equipment whose equipment defect map has been generated comprises:

a process of calculating cell similarity of each cell position of each product, for each piece of equipment that each product passed through, and whose equipment defect map has been generated; and a process of calculating map similarity for each piece of equipment whose equipment defect map has been generated, wherein the cell similarity of a specific cell position is a ratio of the number of defective cells in the specific cell position of the equipment defect map to the number of defective cells in the specific cell position of the sample defect map, and the map similarity is the average of cell similarity values of at least some of the cell positions.

11. An apparatus for determining defective equipment, the apparatus comprising:

a sample defect map generator which is configured to generate a sample defect map which shows defect distribution in cells of a defective sample;

an equipment defect map generator which is configured to generate equipment defect maps of a plurality of pieces of equipment through which the products of the defective sample passed; and a determiner which is configured to calculate map similarities between the sample defect map and the equipment defect maps and determining one or more defective pieces of equipment of the plurality of pieces of equipment, which are the cause of the defective sample, based on the map similarities, wherein the defective sample comprises the products, each of the products being divided into a plurality of cells, and one of the equipment defect maps for one of the plurality of pieces of equipment, shows a defect distribution in cells of the products that passed through the one of the plurality of pieces of equipment, wherein the determination unit calculating cell similarity of each cell position of each product, for each piece of equipment that each product passed through, and whose equipment defect map has been generated; and calculating map similarity for each piece of equipment whose equipment defect map has been generated, wherein the cell similarity of a specific cell position is a ratio of the number of defective cells in the specific cell position of the equipment defect map to the number of defective cells in the specific cell position of the sample defect map, and the map similarity is the average of cell similarity values of at least some of the cell positions.

12. The apparatus of claim 11, wherein each piece of equipment is identified by a combination of a corresponding process identifier and a corresponding equipment identifier.

* * * * *